United States Patent Office

3,519,556
Patented July 7, 1970

3,519,556
PRETREATMENT OF HYDROCONVERSION
CATALYSTS
Hans U. Schutt, Berkeley, Calif., assignor to Shell Oil
Company, New York, N.Y., a corporation of Delaware
No Drawing. Filed Dec. 18, 1967, Ser. No. 691,219
Int. Cl. C10g 13/02; B01j 11/74
U.S. Cl. 208—111                                  10 Claims

ABSTRACT OF THE DISCLOSURE

Hydroconversion catalysts prepared by incorporating hydrogenation metal components into a hydrogel of refractory oxide and containing at least one Iron Group hydrogenation metal component are greatly improved in catalytic activity, stability and regenerability by subjecting the catalyst to a special activation consisting of sequential calcination and sulfiding at a temperature of at least 930° F.

BACKGROUND OF THE INVENTION

Field of the invention

This invention relates to catalytic hydroconversion of hydrocarbon oils. In particular, it relates to an improved catalyst activation treatment for hydroconversion catalyst which results in superior catalytic performance.

Description of the prior art

In the hydrogenation of hydrocarbon fractions, catalysts are used which comprise a hydrogenation component usually on a suitable support such as silica, alumina, or mixtures thereof. The hydrogenation component is customarily supplied by a transition metal or metals, e.g., metals from Group VI-B and Group VIII and some Group I-B metals. Particularly suitable metals are copper, nickel, tungsten, cobalt, and molybdenum. The catalysts are conventionally prepared by impregnating the support with a solution or dispersion of a decomposable salt of the metal hydrogenation component, followed by calcination in air to convert the salt to metal oxide. The hydrogenation component can be employed as the metal, metal oxide, metal sulfide, or mixtures thereof.

It is frequently desirable to convert the metal to its sulfide, as for example, when the catalyst is used to process a sulfur-containing feed.

In general, the art teaches that sulfiding, i.e., conversion of the metal hydrogenation component to its sulfide form, can be accomplished by contacting the catalyst with hydrogen sulfide or organic sulfur compounds mixed with hydrocarbons, etc., at elevated temperatures of up to about 1200° F. However, loss in catalyst activity can result if sulfiding is carried out at high temperature. Consequently, it is customary to employ relatively low temperatures, i.e., in the range of 750° or lower to avoid sintering of the metal components and to meet metallurgical limitations of the process equipment. For catalysts which have metals such as nickel incorporated by impregnation, the art specifically teaches that sulfiding temperature should not exceed 750° F.—see, for example, U.S. 3,325,396 and U.S. 3,324,045.

It has recently been proposed to use metal fluoride hydrogel catalyst for hydrogenation in which the metal components are incorporated by reaction, e.g., ion-exchange, into a hydrogel of the refractory oxide support which is substantially free (usually less than 0.1% by weight) from sodium. Such catalysts are called hereinafter "hydrogel prepared." This method incorporates the hydrogenation metal into the support in a complex reacted state. These catalysts can be used with the metal in the incorporated state, but when used with sulfur-containing feeds, tend to pick up some sulfur by adsorption of sulfur compounds or by reaction of sulfur with unreacted metal or metal not complexed with the support. It is also known that with these new catalysts, for example, a hydrogel catalyst containing a nickel hydrogenation component, the metal component is not easily converted to the sulfided form by conventional sulfiding techniques.

SUMMARY OF THE INVENTION

It has now been discovered that the catalytic performance of a hydroconversion catalyst prepared via incorporation of Iron Group metal into a hydrogel of a refractory oxide substantially free from sodium can be markedly enhanced by a critical high temperature activation. Hydroconversion catalysts comprising an Iron Group metal (iron, cobalt, or nickel) either alone or in combination with a Group VI-B metal (chromium, molybdenum, or tungsten), fluorine and a siliceous refractory oxide are surprisingly improved in activity, stability, and regenerability when subjected to an activation which comprises, in sequence, calcining at a temperature of at least 930° F. followed by sulfiding at a temperature of at least 930° F. It is an essential requirement that calcination and sulfiding be conducted in sequence, that the catalyst be cooled for initial sulfiding to a temperature of at least about 575° F., and that the catalyst not be exposed to air or moisture between calcination and sulfiding.

The calcination treatment of the invention is carried out at a temperature of at least 930° F. by passing a non-reducing gas over the catalyst for a period of at least two hours and preferably at least five to ten hours. Sulfiding is effected by contacting the catalyst with a sulfur compound containing gas at a temperature of at least 930° F.

The advantageous results obtained by the special activation treatment of the present invention are particularly surprising in view of the prior art which, while disclosing metal sulfides as a suitable hydrogenative component, does not suggest the substantial change in chemical nature and catalytic species which results from the high temperature activation of the present invention.

Sulfiding of hydrogel prepared catalysts at temperatures higher than that desirable for conventional impregnated catalysts results in interaction of sulfur with the metallic components and refractory support in such a way as to give an entirely new catalyst which has not only increased activity, but increased stability and improved regenerability. The chemistry of high temperature sulfiding is not completely understood; however, it is believed to be related to the chemistry of the Iron Group metal ions in the siliceous refractory oxide system. The enhanced performance of the catalyst apparently results from the interaction between the metal ions, the fluoride, and the refractory oxide.

When the metal component is present as the metallic oxide, the metal oxides or metal complexes in the structure are somewhat mobile and tend to migrate to form large aggregates resulting in decreased hydrogenation activity and loss of catalytic balance between the hydrogenative and cracking activities. The marked mobility of the oxide ions in silica-alumina is well established (Mills and Hendin, JACS, 72, 5549, (1950)).

The role of fluoride in the hydrogel prepared composites is believed to be primarily one of protecting the metal atoms from aggregation. The role of sulfur, incorporated in the catalyst composite at high temperatures according to the present invention, is also considered to be that of a ligand in the complex structure in coordination with fluoride ions which inhibits the aggregation of dispersed metal, thereby producing and preserving the number of integrated acidic (cracking) and hydrogenation catalytic sites.

The effect of precalcination on the incorporation is not fully understood. While the precalcinatiton results in the removal of chemically bound water and other contaminants, such as residual ammonia from the preparation of the catalyst, this does not appear to offer a completely satisfactory explanation of the resulting effects. It appears that the calcination treatment somehow activates or modifies the refractory oxide chemical structure in such a way that sulfur is more easily and efficiently incorporated into the total complex. This explanation is consistent with the fact that the sulfur, fluoride, metal, and refractory oxides, in these hydrogel composites apparently exist in a complex coordinated state rather than as individual, distinct and identifiable chemical species.

The complex catalysts prepared by incorporation of the metal and fluoride component into a siliceous hydrogel and sulfided according to the invention do not show evidence of the existence of metal crystallites. X-ray diffraction patterns of metal and sulfided metals prepared by simple impregnation of the metal in xerogels show distinct diffraction bands corresponding to metal and/or metal sulfide crystallites. However, catalyst composites prepared by the present hydrogel technique and activated according to the method of the present invention show no or very weak diffraction bands corresponding to distinct metal or metal sulfide crystallites.

Thus the teaching of the prior art concerned with preparation, activation, and special handling procedures for conventionally impregnated catalysts in which the metal is deposited on the surface or ion exchanged into the refractory base is of little value for these new catalytic composites. The prior art teachings would require extensive experimentation to determine applicability or inapplicability to catalytic composites made according to the hydrogel techniques described herein.

The function of the precalcination in the present invention is, therefore, entirely different from the function of conventional calcination. The precalcination to activate the catalyst for sulfur incorporation must be made immediately preceding the sulfiding treatment to avoid contact with air or moisture pickup by the catalyst. Following calcination, the catalyst must be cooled to a temperature of about 575° F. or below. When the catalyst is not cooled to at least 575° F. prior to the start of sulfiding, the $H_2S$ is selectively removed at the top of the catalyst bed and the remainder of the catalyst exposed to hydrogen. Exposure to hydrogen without $H_2S$ present results in catalyst deactivation. When sulfiding is begun at 575° F. or below, sufficient $H_2S$ is distributed throughout the bed to prevent damage to the catalyst from high temperature contact with hydrogen. Of course, if the sulfiding gas is substantially pure sulfur or $H_2S$, contacting with hydrogen at high temperature does not occur. Thus in one embodiment of the invention sequential calcination and sulfiding at a temperature of 930° F. without intermediate cooling when sulfiding in the substantial absence of hydrogen is employed. It is preferable that sulfiding take place in the presence of hydrogen—this being the most advantageous and practical method to accomplish the desired results.

The calcination treatment of the present invention can be conducted in various ways as will be understood by those skilled in the art. However, since calcination and sulfiding must be conducted sequentially, it is most appropriate and especially preferred that the total treatment be carried out in situ in the hydroconversion reactor vessel.

Any suitable nonreducing gas may be used for the calcination, such as air or nitrogen, so long as the gas used does not contain hydrocarbon which will leave carbon residue or coke on the catalyst and does not contain catalyst poisons such as carbon monoxide, nitrogen compounds, etc. Commercial nitrogen or dry air is especially preferred for the calcination treatment.

The temperature at the outset of the calcination is not critical so long as a temperature of at least 930° F. is reached during the treatment. The catalyst should be in contact with a flowing stream of calcination gas for a period of at least two hours at a temperature of at least 930° F. It is particularly appropriate to carry out the calcination treatment by passing a stream of inert calcination gas over the catalyst while at the same time raising the temperature thereof.

Following the calcination, the catalyst temperature is reduced to below 575° F. and sulfiding begun.

The sulfiding treatment may also be carried out in various ways as will be evident to those skilled in the art. The sulfiding is accomplished according to the invention by contacting the catalyst with sulfur or sulfur compound containing gas at a temperature initially below 575° F. and raising the temperature to at least 930° F. where it should be maintained for a period of at least one hour.

Any sulfur compound which decomposes in the presence of hydrogen and the catalyst, allowing the sulfur to be reacted with the catalyst, is suitable. Hydrogen sulfide is usually available, inexpensive, and particularly suitable. Carbon disulfide and lower boiling mercaptans are further examples of suitable sulfur compounds.

While the concentration of the sulfiding gas is not critical to accomplish the object of the invention, it is desirable to maintain the sulfur concentration (calculated as $H_2S$) below about 20% volume. It is especially preferred to use about 10% volume of $H_2S$ in hydrogen as the sulfiding gas. The purity of the gas stream is not critical so long as substantial amounts of hydrocarbons which produce coke or carbon on the catalyst are not present. Process recycle or plant hydrogen streams often available in a refinery are suitable.

The sulfiding treatment of the invention can be carried out at any desired pressure. It is often convenient, however, to conduct the sulfiding at elevated pressure to allow recycle of the sulfiding gas with the existing plant gas compressors and to achieve a relatively high mass flow rate for good distribution and contact with the catalyst. A pressure in the range of about 500 p.s.i.g. is very suitable.

The treatment according to the invention is especially suitable for hydrocracking catalyst, but is also appropriate for hydrofining catalysts used to remove feed impurities, such as nitrogen and sulfide compounds (as for example, first stage hydrocracking catalyst) and for other hydroconversion of hydrocarbons as, for example, isomerization and hydrogenation of olefins and aromatics.

To achieve the advantages of the invention, it is essential that at least one of the metallic catalyst components be an Iron Group metal, preferably nickel. Hydrogel prepared catalysts having no Iron Group metal component do not respond to treatment of the invention. It is also essential that the form of the catalytic species be such that the coordination of the metal, sulfur and fluoride with the refractory oxide can take place, i.e., by corporation of the metal into a hydrogel substantially free from sodium. Catalyst composite in which a metal, or metal compound, exists merely as a residue on the support which is converted to metal sulfide would not respond to the sulfiding treatment of the invention.

Catalysts prepared by incorporation of hydrogenation components into a sodium-free hydrogel of refractory oxide possess this ability for coordination interaction and are thus the type of catalysts for which this invention is particularly applicable.

In general, the catalyst will contain from about 0.1–25% by weight of the Iron Group metal from about 0.1–7% by weight fluoride, and optionally 1–15% by weight Group VI-B metal, based on the total weight of the catalyst. Particularly effective catalysts contain about 2% to 5% by weight of Iron Group metal. Nickel is an especially active catalyst component and is preferred.

A particularly suitable cracking component is predominantly silica containing from about 40 to 90% by weight silica with the remainder, i.e., 60 to 10% being alumina, titania, magnesia, or the like. A silica-alumina catalyst base having good cracking activity comprises from about 70–90% silica and from about 30–10% alumina. Other acid-bearing refractory oxides such as silica-alumina-zirconia, may also be used. These acid-acting refractory oxides are primarily amorphous materials and are to be distinguished from crystalline alumino-silicates known in the art as zeolites or molecular sieves. The preparation of amorphous refractory oxide materials is described in Catalysis VII, Reinhold Publishing Co., New York, 1960, pages 1–9.

The catalyst may be in any physical form suitable for use in a hydroconversion operation. Thus, powdered, granular, and extruded pellets of catalysts are subject to the treatment of the invention.

Hydrogenation processes, including hydrocracking, using the catalyst treated according to the invention may be effected at a temperature in the range from about 500–750° F., hydrogen partial pressure of about 750 to 2000 p.s.i., and liquid hourly space velocity (LHSV) from about 0.1 to about 5 volumes of feed per hour per volume of catalyst. In practice, a hydrocracking process is generally designed for a low space velocity of about 0.5 to 2. During operation, a sulfur compound is desirably added to the feed in many hydroconversion processes to maintain the catalyst in its sulfided form. The sulfur may be a natural component in the feed or added into the feed. In general, conversion increases as the temperature is increased or as the space velocity is decreased. Therefore, to maintain a relative constant conversion, it is necessary to increase temperature periodically to compensate for any gradual loss of activity of the catalyst resulting from accumulation of carbonaceous deposits or catalyst poisons present in the feed. However, because of temperature or other limitations, the process must ultimately be discontinued to regenerate the catalyst, such as by a controlled burning in dilute air.

DESCRIPTION OF A PREFERRED EMBODIMENT

As noted above, it is essential that the catalyst used be one comprising an Iron Group metal (iron, cobalt, or nickel) component and fluoride. It is preferred that the catalyst contain nickel as the Iron Group component.

An especially suitable catalyst is one which contains nickel together with a Group VI–B component (chromium, molybdenum, or tungsten).

Catalysts which are susceptible to the activation treatment are prepared by incorporating an Iron Group metal and a Group VI–B metal and fluoride into a hydrogel of a siliceous refractory oxide such as silica-alumina. Silica-alumina hydrogel can be prepared in any conventional manner. In one method, sodium silicate is reduced to about pH 9 by the addition of a mineral acid such as sulturic acid, after which an aqueous solution of aluminum sulfate is added. The mixture is then neutralized with a base such as ammonium hydroxide. The hydrogel which forms is washed with, for example, acidulated water (e.g., demetalized water) or ammonium nitrate solution to remove undesirable ions such as sodium and sulfate. This method is generally referred to as "acid side" gelation.

A suitable hydrogel can also be prepared by "base side" gelation. For example, an aqueous solution of sodium silicate is mixed with an aqueous solution of sodium aluminate. A mineral acid is added to the mixture to bring the pH to about 7. The resulting silica-alumina is suitably washed to remove undesirable ions such as sodium.

Hydrogenation components are incorporated into the catalyst by contacting the hydrogel with an aqueous cationic solution of an Iron Group metal compound and a Group VI–B metal compound, the Iron Group metal being incorporated before the incorporation of the Group VI–B metal. For example, metal salts, such as sulfate, nitrate or fluoride are suitable, fluoride being preferred.

Fluoride can be incorporated into the hydrogel in any appropriate manner, for example, as the hydrogel is being formed or in solution with the metal component, the latter method being preferred. The hydrogel containing the metal component and fluoride component is then generally washed with water to remove excess solution and calcined with air at a temperature of about 800–1200° F.

In one embodiment of the invention a catalyst as described above is placed in a suitable fixed bed reactor vessel and the temperature raised to about 1000° F. at the rate of 50° F./hour while passing dry nitrogen at a rate of about 1000–5000 volume/volume of catalyst/hour over the catalyst. The catalyst is held at 1000° F. for a period of 10 hours while nitrogen flow is continued. After 10 hours, the catalyst temperature is cooled to below 575° F. and the nitrogen is replaced by a stream of $H_2S$ in dry hydrogen and continued until sufficient hydrogen sulfide has been added to give at least about 1% weight sulfur on the catalyst and the catalyst has been contacted for at least one hour at 1000° F. The catalyst bed is then cooled to a temperature suitable for the introduction of hydrocarbon feed. Similarly, after regeneration of spent catalyst by burning off deposited carbon, the same procedure can be followed to activate the regenerated catalyst; however, a separate calcination is not required if the regeneration is carried out at appropriate calcination conditions.

The following examples are included by way of illustration of the practice of and the advantages of the activation treatment of the invention.

EXAMPLE I

A catalyst was prepared by incorporation of nickel, tungsten, and fluorine into a substantially sodium-free hydrogel of silica alumina. After incorporation of the catalytic component the catalyst was dried and calcined in air at 930° F. The finished catalyst contained 3.1% w. nickel, 2.6% w. tungsten, and 2.2/ w. fluorine.

Following the calcination, the catalyst was stored at ambient conditions.

A portion of the catalyst was placed in a small experimental unit and sulfided by contact with a stream of $H_2S$ in hydrogen at 932° F. for two hours, sulfiding having been begun at 390° F. The flow rate during sulfiding was 550 volumes of gas/hour per volume of catalyst.

Another portion of the same catalyst was placed in a similar reactor, calcined in air for 10 hours at 932° F., cooled to 392° F. and sulfided by contacting with a stream of $H_2S$ in hydrogen for 18 hours, during which time the catalyst temperature was raised to 932° F., the catalyst being sulfided at 932° F. for a period of about six hours.

These catalysts were tested for hydrocracking a midcontinent catalytically cracked heavy gas oil at 1500 p.s.i.g., 0.67 LHSV, and 10/1 hydrogen to oil mole ratio. The gas oil used had been pretreated to reduce the nitrogen content to 3 p.p.m. Catalyst activity is indicated by the temperature required to maintain a constant conversion of 67% of the feed to gasoline boiling range products.

After an initial catalyst conditioning period of 80 hours operation, the temperature requirement of the uncalcined catalyst was 556° F. The precalcined catalyst had a temperature requirement of only 540° F. after the same processing period, a 16° F. activity advantage.

The importance of this activity advantage is doubly important since it not only allows initially lower heating cost but also allows a longer processing period before regeneration and/or allows increased throughput (at higher space velocity) in an existing fixed volume reactor system.

EXAMPLE 2

This example demonstrates the total effect of the activation treatment of the invention over conventional sulfiding techniques. A hydrogel prepared catalyst containing 5.5% nickel, 3.0% w. tungsten and 3.4% w. fluorine was used. In one case, the catalyst was given a conventional pretreatment which included heating to 930° F. for 15 minutes in nitrogen, cooling to 392° F., sulfiding by contact with $H_2S$ containing hydrogen for two hours at a maximum temperature of 707° F.

A second catalyst sample was calcined at 930° F. in air for 10 hours, cooled to 392° F. and sulfided with a mixture of $H_2S$ in hydrogen for six hours at a temperature of 932° F.

These catalysts were tested under the same conditions as described in Example 1.

The conventionally treated catalyst required a temperature of 574° F. to obtain 67% conversion after 80 hours of operation. The second catalyst, activated according to the invention, required only 525° F. for 67% conversion after 80 hours of operation—an activity advantage of 49° F.

EXAMPLE 3

Hydrogel prepared catalysts containing 4.6% w. nickel, 3.2% w. tungsten, and 3.2% w. fluorine on silica alumina were activated by two different methods. In one case activation was carried out according to the method of the invention. The catalyst was calcined at 932° F. for 10 hours, cooled to 392° F. and sulfided with 20% $H_2S$ in hydrogen while raising the temperature to 932° F. Sulfiding was carried out for six hours.

In the second case the catalyst was calcined in the same way but was not cooled before introduction of the $H_2S/H_2$ mixture for sulfiding, i.e., sulfiding was commenced at 932° F. and continued for 10 hours.

The catalysts were tested for hydrocracking as described in Example 1.

After 80 hours of operation to obtain 67% conversion to gasoline, the first activated catalyst (cooling between calcination and sulfiding) required a temperature of only 518° F. The second catalyst sulfided without intermediate cooling required a temperature after 80 hours of 554° F. Thus where sulfiding is carried out in the presence of hydrogen, the catalyst must be cooled prior to the start of sulfiding.

EXAMPLE 4

A hydrogel prepared catalyst containing 3.9% w. nickel and 2.7% w. fluoride on silica-alumina was tested in an identical manner as described in Example 2. The conventionally pretreated catalyst required a temperature of 567° F. for 67% conversion after 80 hours of operation whereas the high temperature activated catalyst required only 523° F.

EXAMPLE 5

This example demonstrates the effect of the activation treatment of the invention on process stability.

Two samples of a hydrogel prepared catalyst containing 4.6% w. nickel, 3.2% w. tungsten, and 3.2% w. fluorine were tested in extended hydrocracking experiments. The catalyst for Run A was pretreated and sulfided in the conventional manner as described in Example 2, i.e., a 15-minute calcination and sulfiding at 707° F. The catalyst for Run B was activated according to the invention as also described in Example 2, i.e., a 10-hour calcination followed by sulfiding at 932° F.

The catalysts were tested for hydrocracking a feed consisting of a mixture of catalytically cracked gas oil and straight run gas oil containing 3.4 p.p.m. nitrogen. The conditions were 1600 p.s.i.g., 10/1 $H_2$/oil mole ratio, 1.5 LHSV and 1.5 combined feed ratio (i.e., ⅓ of total feed was recycle gas oil boiling range product). The results are shown in Table 1.

TABLE 1

| | Run | |
|---|---|---|
| | A | B |
| Pretreatment | Conventional | High temperature calcination and sulfiding |
| Activity of a after: | | |
| 5 days operation | 613 | 576 |
| 10 days operation | 631 | 601 |
| 20 days operation | 657 | 628 |
| 30 days operation | 667 | 639 |
| 40 days operation | 678 | 640 |
| 50 days operation | 684 | 646 |
| 58 days operation | b 721 | 648 |
| 60 days operation | | 648 |
| 70 days operation | | 649 |
| 120 days operation | | 653 | a Temperature required for 67% conversion to gasoline.
b Run terminated due to accelerating deactivation.

This experiment clearly shows the effect of the special activation of the invention on catalyst stability. Not only did the activated catalyst possess high initial activity, but also maintained its activity with only a very slow rate of deactivation for a total of 120 days of stable operation when mechanical upsets in the reactor system caused eventual shutdown.

EXAMPLE 6

To demonstrate the advantages of activation on catalyst regenerability, a hydrogel prepared catalyst containing 4.6% w. nickel, 3.1% w. tungsten, and 3.4% w. fluorine on silica alumina was pretreated by calcining at 932° F. at a rate of 54° F./hour and maintained at 932° F. and then sulfided with a 10/1 $H_2/H_2S$ gas mixture. The temperature during sulfiding was raised from 392° F. to 932° F. at a rate of 54° F./hour and maintained at 932° F. for two hours. The catalyst was tested for hydrocracking a combined light and heavy catalytically cracked gas oil containing 3.8 p.p.m. nitrogen and 7.5 p.p.m. fluoride and from 0.18 to 1.0% sulfur at 1800 p.s.i.g., 0.67 LHSV, 10/1 $H_2$/oil ratio and 1.5 combined feed ratio. The test run was continued for 45 days. The temperature required to maintain 67% conversion to gasoline was on the average about 20° F. lower than for similar catalyst conventionally sulfided at 707° F.

The catalyst was regenerated at a temperature of about 850° F. and 450 p.s.i.g. using a regeneration gas containing about 0.5% oxygen in nitrogen for 32 hours. The catalyst was then flushed with nitrogen, cooled to 390° F., and contacted with 9% $H_2S$ in hydrogen while raising the temperature to 932° F. where it was held for two hours.

Hydrocracking under the same conditions was resumed. The regenerated catalyst required a temperature to obtain 67% conversion to gasoline which was about 11° lower than for a fresh catalyst sulfided at 707° F. This operation was continued for 58 days, the run was stopped and the catalyst examined.

The spent catalyst had accumulated only 0.63% carbon as compared to 1 to 2% expected for conventionally pretreated catalyst of the same type after the same period of operation under the conditions of the test. These surprising results clearly indicated that the activation procedure of the present invention improves existing active catalytic sites in such a way that coke deposition on the catalyst is greatly retarded. Reduced coking not only prolongs catalyst useful life but also reduces the time and severity of regeneration, thus reducing the possibility of damage to the catalyst.

These results substantiate that the activation according to the invention not only increases catalyst activity but also improves catalyst process stability and process life and is effective for regenerated as well as fresh catalyst. Moreover, the influence of the treatment on coke deposition is significant.

I claim as my invention:
1. In the hydrocracking of hydrocarbons using a cata- lyst comprising 0.1–25% w. Iron Group metal, 0.1–7% w. fluoride and an amorphous refractory oxide cracking support, in which the metal, fluoride and refractory oxide are capable of coordinate bonding; the improvement which comprises activating the catalyst by sequentially calcining in a nonreducing gas stream at a temperature of at least 930° F. followed by sulfiding with a gaseous sulfur compound at a terminal temperature of at least 930° F. for at least one hour, the temperature between calcining and sulfiding being maintained sufficiently high to prevent moisture adsorption.

2. In the hydrocracking of hydrocarbons using a catalyst comprising 0.1–25% w. Iron Group metal, 0.1–7% w. fluoride and an amorphous refractory oxide cracking support, in which the metal, fluoride and refractory oxide are capable of coordinate bonding; the improvement which comprises activating the catalyst by sequentially calcining in a non-reducing gas stream at a temperature of at least 930° F. followed by cooling below about 575° F. and sulfiding with a gaseous mixture of a sulfur compound in hydrogen while raising the temperature to attain a terminal temperature of at least 930° F. for at least one hour.

3. The improvement of claim 2 wherein the catalyst subjected to the treatment has been prepared by contacting a substantially sodium-free hydrogel of the refractory oxide with an aqueous solution of the metal and fluoride followed by washing, drying, and calcining.

4. The improvement of claim 3 wherein the refractory oxide is silica-alumina and the metal is nickel.

5. The improvement of claim 3 wherein the refractory oxide is silica-alumina and the sulfiding gas is $H_2S$ in hydrogen in a concentration less than about 20%.

6. The improvement of claim 2 wherein the catalyst also contains 1–15% w. Group VI–B metal component 7. The improvement of claim 5 wherein the catalyst contains nickel and tungsten, the sulfiding treatment is carried out with a gas comprising hydrogen and $H_2S$ and the terminal temperature of the sulfiding is at least above 1000° F.

8. The improvement of claim 2 wherein the catalyst subjected to the treatment has been deactivated in the hydrocracking process and subjected to controlled burning in dilute air to effect carbon removal, and the sulfided catalyst is reused in the hydrocracking process.

9. A method for increasing the hydrocracking activity of both fresh and regenerated catalyst comprising 0.1–25% w. Iron Group metal, 0.1–7% w. fluoride and an amorphous refractory oxide cracking support, in which the metal, fluoride and refractory oxide are capable of coordinate bonding, wherein the catalyst is subjected to the sequential steps of calcining in a nonreducing gas at a temperature of at least 930° F., cooling below about 575° F. and sulfiding with a gaseous mixture of a sulfur compound in hydrogen, while raising the temperature to a terminal temperature of at least 930° F. for at least one hour.

10. The method of claim 9 wherein the catalyst also contains 1–15% w. Group VI–B metal component.

References Cited

UNITED STATES PATENTS

| | | | |
|---|---|---|---|
| 3,223,652 | 12/1965 | Erickson et al. | 252—439 |
| 3,324,045 | 6/1967 | Mason | 252—439 |
| 3,325,396 | 6/1967 | Lindquist | 208—111 |

PATRICK P. GARVIN, Primary Examiner

U.S. Cl. X.R.

208—112; 252—439